(12) United States Patent
Anderson et al.

(10) Patent No.: US 6,443,627 B1
(45) Date of Patent: Sep. 3, 2002

(54) DUPLEX OPTICAL CONNECTOR

(75) Inventors: Jerry Max Anderson, Austell, GA (US); Liang Hwang, Old Bridge, NJ (US); Steven Edward Sheldon, Norcross, GA (US)

(73) Assignee: Fitel USA Corp., Norcross, GA (US)

( * ) Notice: Subject to any disclaimer, the term of this patent is extended or adjusted under 35 U.S.C. 154(b) by 57 days.

(21) Appl. No.: 09/756,698

(22) Filed: Jan. 10, 2001

(51) Int. Cl.7 .................................................. G02B 6/38
(52) U.S. Cl. .......................................... 385/56; 385/60
(58) Field of Search ............................. 385/56, 58, 60, 385/59, 66, 75, 53, 139

(56) References Cited

U.S. PATENT DOCUMENTS

| | | | |
|---|---|---|---|
| 4,787,706 A | 11/1988 | Cannon, Jr. et al. | 350/96.2 |
| 4,953,929 A | 9/1990 | Basista et al. | 350/96.2 |
| 5,123,071 A * | 6/1992 | Mulholland et al. | 385/53 |
| 5,142,597 A * | 8/1992 | Mulholland et al. | 385/55 |
| 5,386,487 A | 1/1995 | Briggs et al. | 385/59 |
| 5,481,634 A | 1/1996 | Anderson et al. | 385/76 |
| 5,579,425 A | 11/1996 | Lampert et al. | 385/59 |
| 5,638,474 A * | 6/1997 | Lampert et al. | 385/136 |
| 5,647,043 A * | 7/1997 | Andreson et al. | 385/78 |
| 5,719,977 A * | 2/1998 | Lampert et al. | 385/60 |
| 5,896,477 A | 4/1999 | Stephenson et al. | 385/53 |
| 5,923,805 A | 7/1999 | Anderson et al. | 385/86 |
| 5,930,425 A | 7/1999 | Abel et al. | 385/53 |
| 5,987,203 A | 11/1999 | Abel et al. | 385/51 |
| 6,041,155 A | 3/2000 | Anderson et al. | 385/139 |

\* cited by examiner

Primary Examiner—Brian Sircus
Assistant Examiner—Chandrika Prasad
(74) Attorney, Agent, or Firm—Michael A. Morra (57) ABSTRACT

A high density optical connecting block 100 is mounted in a relatively thin, flat panel 10, and is constructed as an array of identical cells 110 that are linked together as a one-piece unit. The cells have a front-to-back depth that is greater than ten millimeters for imparting flexural rigidity to the panel. The array includes at least twelve cells that are arranged in two or more rows and two or more columns. Each cell has a front side that is shaped to receive and interlock with a duplex optical connector 50, and a back side that is shaped to receive and interlock with two simplex optical plugs 20. The duplex connector is a unifying structure that yokes a pair of simplex optical plugs 20-1, 20-2 into a duplex configuration. The duplex connector includes a pair of side-by-side cavities 153-153, each having: (i) an opening at a back end that is shaped to receive a simplex optical plug; (ii) a tubular boss 58 for holding a cylindrical ferrule or a plastic optical fiber, the boss projecting into and out of the cavity from a front-end wall 57 of the cavity and having a central axis that is perpendicular to the front-end wall; and (iii) a retaining feature 54 for holding each simplex plug within the cavity. Additionally, the duplex connector includes latching members 55-55 on its top and bottom sides that interlock with the cell.

17 Claims, 6 Drawing Sheets

DUPLEX OPTICAL CONNECTOR

CROSS REFERENCE TO RELATED APPLICATIONS

This patent application is related to application Ser. No. 09/756,715 (Anderson 15-10), which is filed concurrently herewith.

TECHNICAL FIELD

This invention relates to a duplex optical connector, which is assembled by joining a pair of simplex optical plugs in a side-by-side relationship.

BACKGROUND OF THE INVENTION

In communication systems, it is frequently desirable to make connections with paired transmission media where, for example, each medium carries information in a different direction. In optical systems, precision alignment is critical and it is customary to use specially designed connectors for aligning each optical fiber. Nevertheless the desire for customer convenience has led to the development of duplex optical connectors which include two optical fibers and the means for aligning same. For example, U.S. Pat. No. 4,787,706 discloses a duplex optical fiber connector for terminating a cable containing a pair of buffered optical fibers—each held within a fiber-holding assembly comprising a ferrule and a spring-loaded base member. The fiber-holding assemblies are contained within a common housing that is formed to include two flexible molded plastic sidearm members for interlocking with a mating receptacle. The housing includes details that can be used for assuring polarization during interconnection with another optical fiber connector. And while this connector provides excellent performance, it requires its own family of connecting apparatus and does not interconnect with apparatus designed for unitary (simplex) connectors.

U.S. Pat. Nos. 4,953,929 and 5,123,071 disclose examples of duplex connectors that yoke a pair of simplex optical plugs together in a duplex configuration. However, such connectors rely on the simplex plugs themselves for interlocking with an associated receptacle. In this situation, the latching mechanism associated with each simplex plug needs to be properly activated to assure good optical connections. Moreover, it is cumbersome to assemble and disassemble the simplex plugs to and from the yoke structures disclosed in these duplex connectors.

U.S. Pat. Nos. 5,481,634 and 5,923,805 disclose low-profile, simplex optical plugs that are known as LC-type optical plugs. Such optical plugs are manufactured by Lucent Technologies. The LC plug is advantageous because it has a smaller footprint than any of its predecessor optical plugs; and it can be used effectively in high-density, panel-mounted applications. Additionally, its design resembles the user-friendly, RJ-style modular plugs that are used in conventional telephone sets. LC optical plugs have become so popular, in fact, that it is desirable to have an apparatus that would yoke a pair of LC plugs, or the like, into a duplex configuration. And although such an apparatus is already available (see U.S. Pat. No. 5,579,425), it also relies on the individual simplex plugs for interlocking with an associated receptacle.

Accordingly, it is desirable to provide a duplex connector that joins a pair of low-profile, simplex optical plugs together into a single structure. Moreover, it is desirable that the associated simplex plugs be quickly and easily assembled and disassembled to and from the duplex connector. Finally, it is desirable for the duplex connector to have its own latching apparatus, which is separate from the latching apparatus of the simplex connectors, for interlocking with an associated receptacle.

SUMMARY OF THE INVENTION

A duplex connector that includes a pair of side-by-side optical ports having internal walls that define a pair of cavities overcomes the above-described deficiencies. Each cavity has an opening in its back end that is shaped to receive a low-profile optical plug, and each cavity has a tubular boss at its front end that is shaped to receive a ferrule that holds an optical fiber. The bosses project outward from the front end of the duplex connector in a direction that is parallel to the longitudinal axis of the cavity. Preferably, each tubular boss contains an alignment sleeve for aligning the central axes of a pair of ferrules that are inserted into the opposite ends of the alignment sleeve. Associated with each cavity is a retaining feature that interlocks with a mating feature on the optical plug and prevents inadvertent decoupling between the plug and cavity. Similarly, the duplex connector itself includes a latching member on an outside surface for interlocking with a mating member that resides on a receptacle, which is designed to receive the duplex connector. These items allow individual simplex optical connectors to be easily assembled and disassembled to and from the duplex connector, and allow the duplex connector to be easily installed and removed from the receptacle using its own latching mechanism(s).

In an illustrative embodiment of the invention, the duplex connector includes cantilever latching members on its top and bottom sides, and the cavities are shaped to receive LC-type optical plugs. Also, in the illustrative embodiment, tongue-like projections (guide members) reside on the top and bottom sides of the connector that perform a number of valuable functions. The guide member on the bottom side is slightly wider than the guide member on the top side to provide a "keying" feature that prevents improper (upside down) insertion of the duplex connector into the receptacle. More importantly, the guide members provide additional strength to withstand side-loading forces that would otherwise be transferred to the alignment sleeves.

BRIEF DESCRIPTION OF THE DRAWING

The invention and its mode of operation will be more clearly understood from the following detailed description when read with the appended drawing in which.

DETAILED DESCRIPTION

The present invention relates to the hardware used in making interconnections between optical plugs such as described above. As discussed above, panel-mounted connections were previously provided via individual buildout blocks and buildouts; or by mounting jack receptacles to a panel to receive small groups of optical plugs. However, such arrangements have: (i) involved far too many individual components that were manually assembled; (ii) have not imparted sufficient rigidity to the panel; and (iii) have not provided sufficient connection density. All of these drawbacks are overcome by the apparatus shown in FIG. 1, which includes a connecting block 100 and a duplex connector 50 that are suitable for use in a connecting panel 10.

Figure 1:
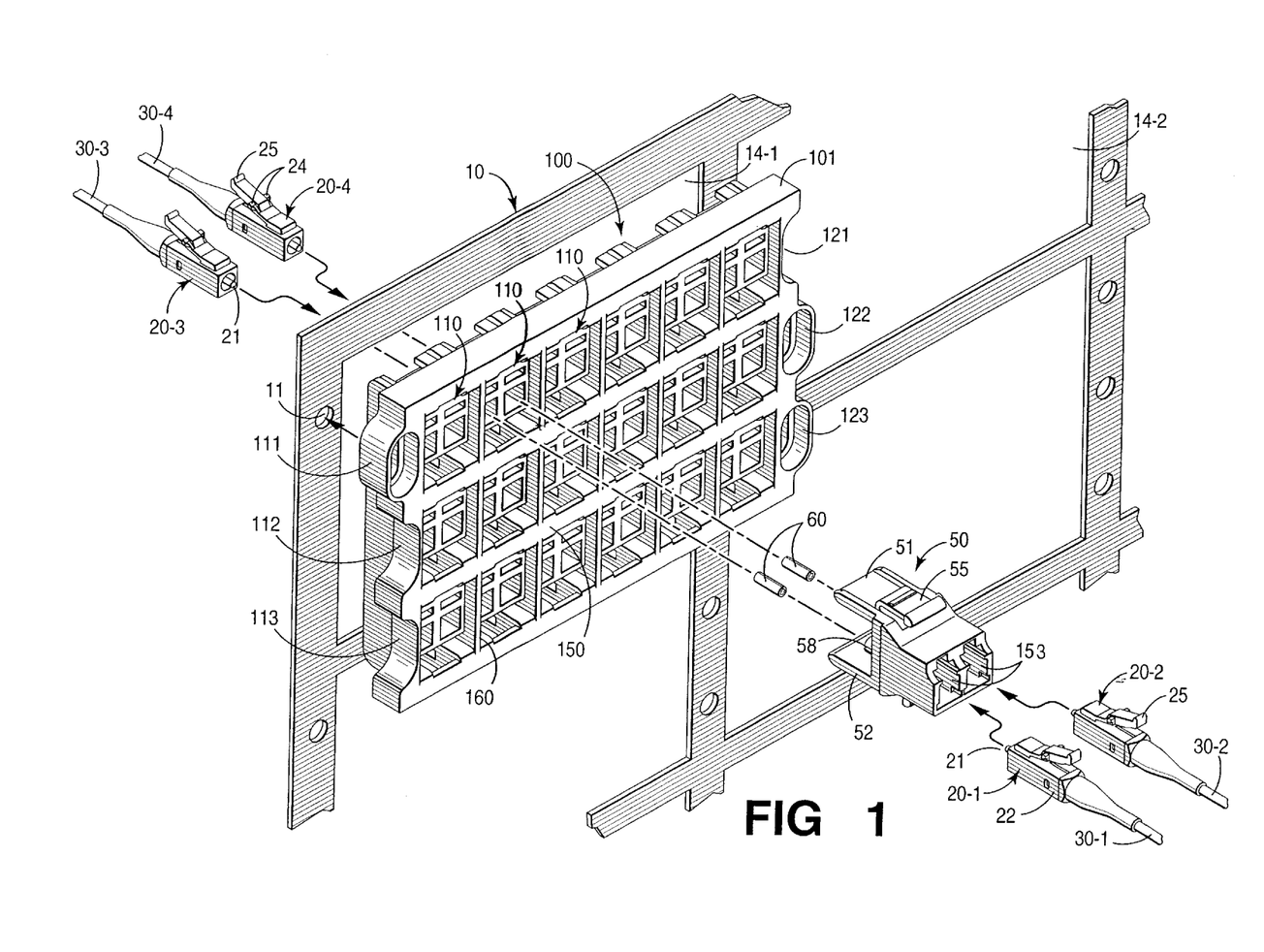
FIG. 1 shows an exploded perspective view of a panel-mounted connecting block receiving a duplex connector in its front side and individual optical plugs in its back side.

FIG. 1 shows an exploded perspective view of an assembly comprising a panel-mounted connecting block 100, a duplex connector 50, and a number of optical plugs 20. The purpose of such an assembly is to centralize and administer interconnections between optical fibers. For example, one optical fiber is contained within optical cable 30-1 and another optical fiber is contained within optical cable 30-3. These cables respectively terminate in optical plugs 20-1 and 20-3. Connecting block 100 and duplex connector 50 facilitate the interconnection between these optical plugs. For the purpose of illustration, the optical plugs 20 shown in FIG. 1 are LC-type plug connectors of the type discussed above. Nevertheless, the present invention may be used with other known optical plugs as well as optical plugs not yet in existence. Each optical plug 20 comprises a generally rectilinear housing 22 having an opening through which a ferrule 21 protrudes. Each ferrule 21 contains a optical fiber (not visible) that extends from the tip of the ferrule, through the optical plug 20, to an optical cable 30. Each optical plug 20 is provided with a latching tab 25 that is positioned on its top side in order to interlock with an associated receptacle.

Panel 10 is provided with a number of elongated continuous slots 14-1, 14-2 that are adapted to accommodate one or more connecting blocks 100. Illustratively, the panel is made from relatively thin steel (e.g., about 2.3 millimeters). As shown, slots 14-1 and 14-2 are sized to receive a single connecting block 100, although it is contemplated that some or all of the horizontal bars in the panel 10 can be eliminated so that a number of connecting blocks can be stacked directly on top of each other. In that situation, it may be desirable to provide mating features (e.g., tabs and slots) on the top and bottom sides of each connecting block for improved rigidity.

The connecting block 100 is preferably molded from a resilient polymeric material such as polyetherimide (PEI) as a one-piece structure. It has a waffle-like structure of interlocked horizontal 150 and vertical 160 ribs, which form cells and provide structural integrity to the panel. The ribs 150, 160 have a front-to-back depth that is greater than 10 millimeters (mm). In a preferred embodiment of the invention, the ribs have a depth of about 13 mm. A flange 101 that circumscribes the connecting block further enhances rigidity. In the preferred embodiment, the flange has a front-to-back depth of about 6 mm. An important feature of the connecting block 100 is that it is constructed as an array of identical cells 110, each being substantially identical to the others in size, shape and orientation, and each being designed to receive a duplex connector in its front side. This is particularly advantageous because it is convenient to organize fibers into pairs—one for each direction of transmission. Moreover, connecting block 100 provides accurate interconnections in a structure having relaxed tolerances. This is because dimensional accuracy is important within each cell to assure proper mating with a duplex connector, but not particularly important between cells.

Suitable interconnection density and flexural rigidity are provided when the cells of the connecting block number at least twelve and are arrayed into at least two rows and at least two columns. Each connecting block is held within a slot 14-1 in the panel 10 by fasteners such as screws and nuts (not shown) that fit through one or more eyelets 111, 122, 123 that are positioned on opposite sides of the connecting block 100. Mating holes 11 are provided in the panel 10 for receiving the screw. The eyelets and screws could be replaced by protrusions that are molded in the connecting block at similar locations. Additionally, recesses 112, 113, 121 are provided on opposite sides of the connecting block that are shaped to be intermatable with the eyelets when the connecting blocks are positioned side by side. Significantly, the eyelets and recesses are keyed to prevent adjacent connecting blocks from be installed improperly (i.e., upside down and/or reversed from front to back). It is noted that the connecting block 100 can be designed to avoid the need for auxiliary fastening hardware (e.g., screws and nuts) by molding wedge-shaped tabs in the region behind the eyelets and recesses that enable the connecting block 100 to be snapped into the panel slot 14-1.

The connecting block 100 is used in conjunction with a number of duplex connectors 50 that individually yoke a pair of simplex optical plugs 20-1, 20-2 into a duplex configuration. Each duplex connector 50 includes a pair of side-by-side optical ports 153-153, each port including internal walls that define a cavity. As illustratively shown in FIG. 1, the cavities are shaped to receive LC-type optical plugs 20-1 and 20-2. Each cavity further includes a tubular boss 58 that extends through a front wall of the cavity for receiving an optical fiber, which is contained within the ferrule 21. It is understood that when plastic fiber is used, ferrules are not needed because plastic fibers typically have a much larger diameter (i.e., about 1 mm) than a glass fiber, which has a diameter of only 125 microns. Nevertheless, when the optical plug has a ferrule containing a glass fiber, alignment between abutting ferrules is preferably accomplished via a cylindrical alignment sleeve 60, which is disposed within the boss 58 and dimensioned to receive a ferrule in each of its ends. Each cavity 153 is designed to receive and interlock with an optical plug 20 installed therein. When LC-type optical plugs are used, the cavity has a generally rectangular opening and includes a retaining feature on an internal wall of the cavity that interlocks with the latching tab 25 on the top side of optical plug 20.

Duplex connector 50 further includes guide members 51 and 52 on its top and bottom sides respectively, and each guide member includes a latch 55 that is designed to interlock with the particular cell 110 that ultimately receives the duplex connector.

Figure 2:
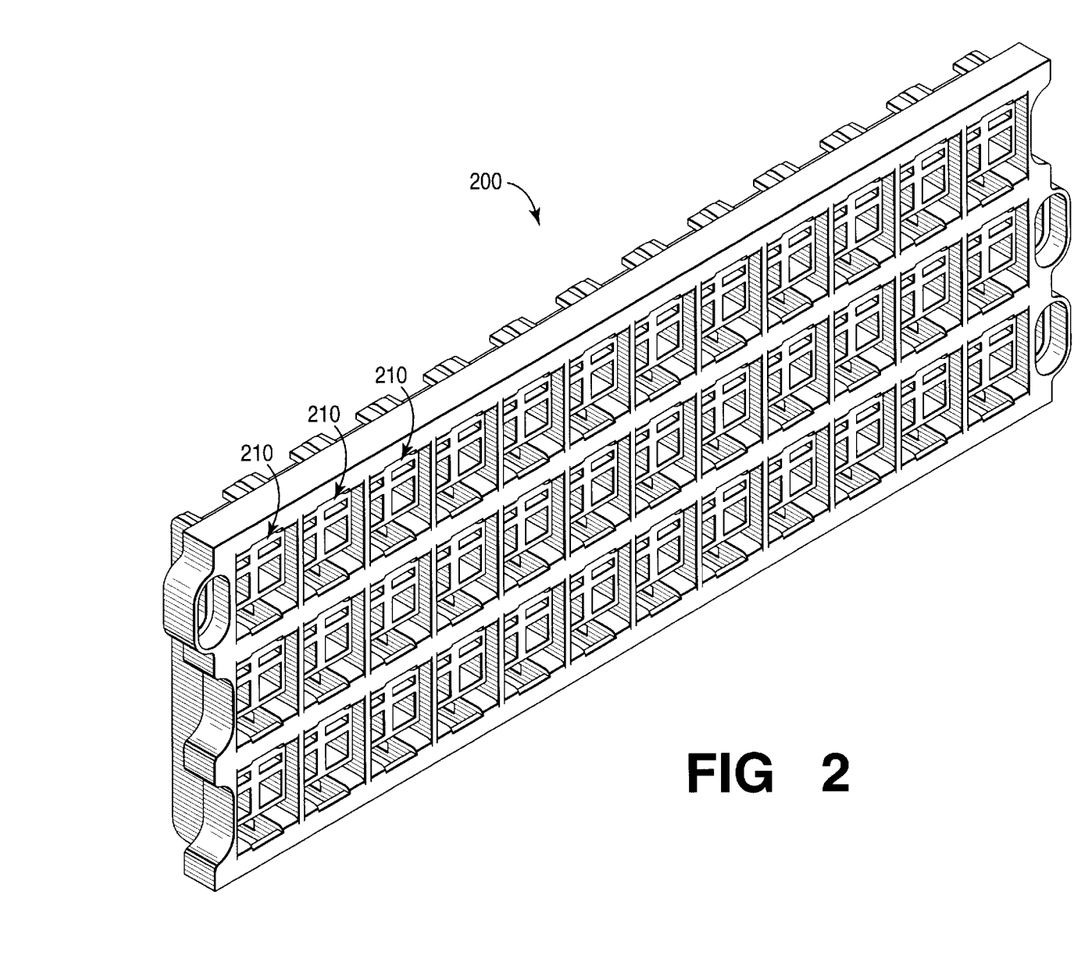
FIG. 2 is a front side perspective view of a preferred embodiment of the connecting block having 36 cells.

FIG. 2 is a front side perspective view of a preferred embodiment of a connecting block 200. It is similar in all respects to the connecting block 100 shown in FIG. 1 with the exception that it includes twice as many cells 210 as are contained in connecting block 100. Nevertheless, since each cell is self contained and designed to receive a single duplex optical connector 50, the connecting block can be made arbitrarily large without substantial concern for overall dimensional tolerances, as would be the case if the connector held 12 optical plugs.

Figure 3:
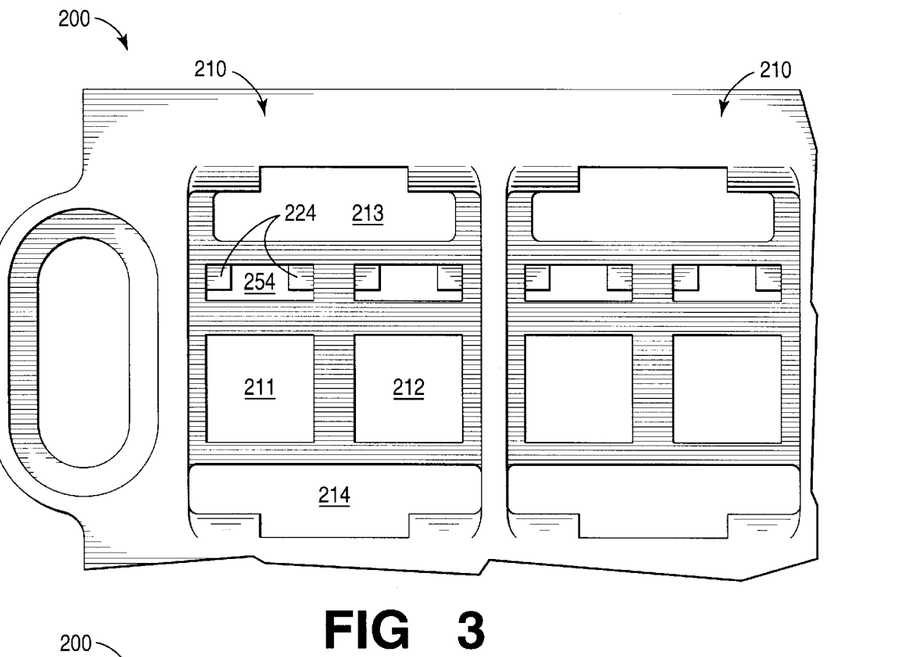
FIG. 3 discloses a front view of a pair of adjacent cells within the connecting block.
Figure 4:
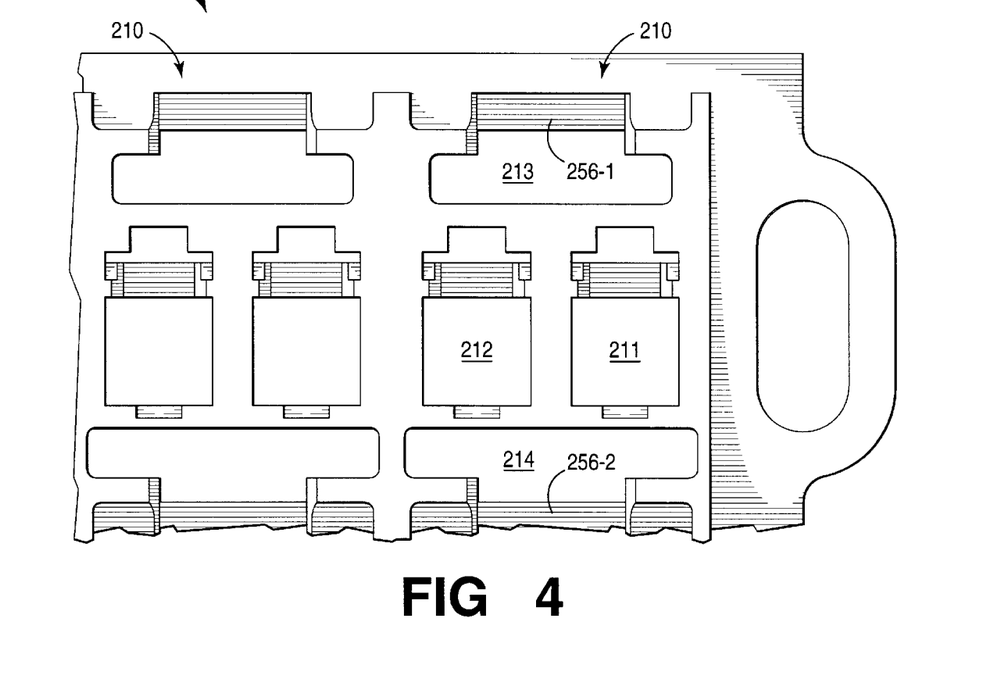
FIG. 4 discloses a back view of the pair of adjacent cells shown in FIG. 3.

FIGS. 3 and 4 respectively show front and back views of a pair of adjacent cells 210-210 within connecting block 200. Cell 210, for example, is shaped to receive a duplex connector 50 (FIGS. 5–9) in its front side as shown in FIG. 3. Openings 213 and 214 are shaped to receive the tongue-like projections (guide members) 51, 52 that are positioned on the top and bottom sides of the connector 50 in only one orientation. To accomplish this, opening 214 is made slightly wider than opening 213. Additionally, each opening 213, 214 contains a retaining feature (i.e., internal ledges 256-1 and 256-2) that is shaped to interlock with a mating feature 56 on the top and/or bottom sides of duplex connector 50 as shown in FIG. 9. Openings 211 and 212 are passages through the connecting block for enabling a pair of optical fibers to be interconnected. Each of the fibers is held within a separate optical plug, and the pair of optical plugs are inserted into opposite sides of the same opening (e.g., opening 211). The front side of each cell 210 is adapted to receive and interlock with a duplex optical connector 50, whereas the back side of each cell is adapted to receive and interlock with a pair of simplex optical plugs 20-3 and 20-4 as shown in FIG. 1. These simplex optical plugs 20-3 and 20-4 each include a latching tab 25 having shoulders 24 that interlock with retaining features (i.e., internal ledges 224-224) that are molded into the connecting block as best seen in FIG. 3. Opening 254 in the connecting block is created by the tool used for molding these internal ledges 224-224.

Duplex Optical Connector

Figure 5:
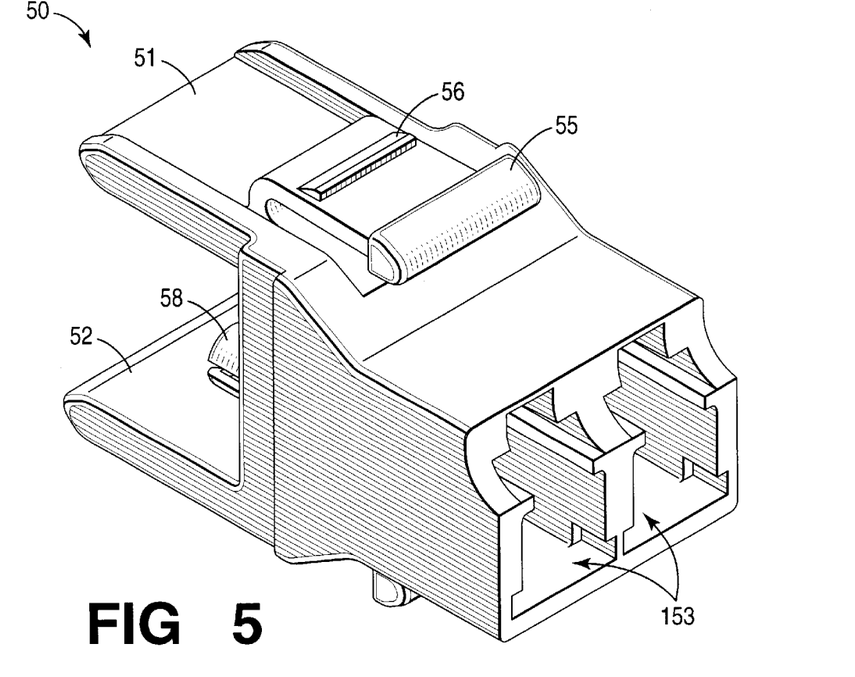
FIG. 5 is a back-end perspective view of a duplex optical connector.
Figure 6:
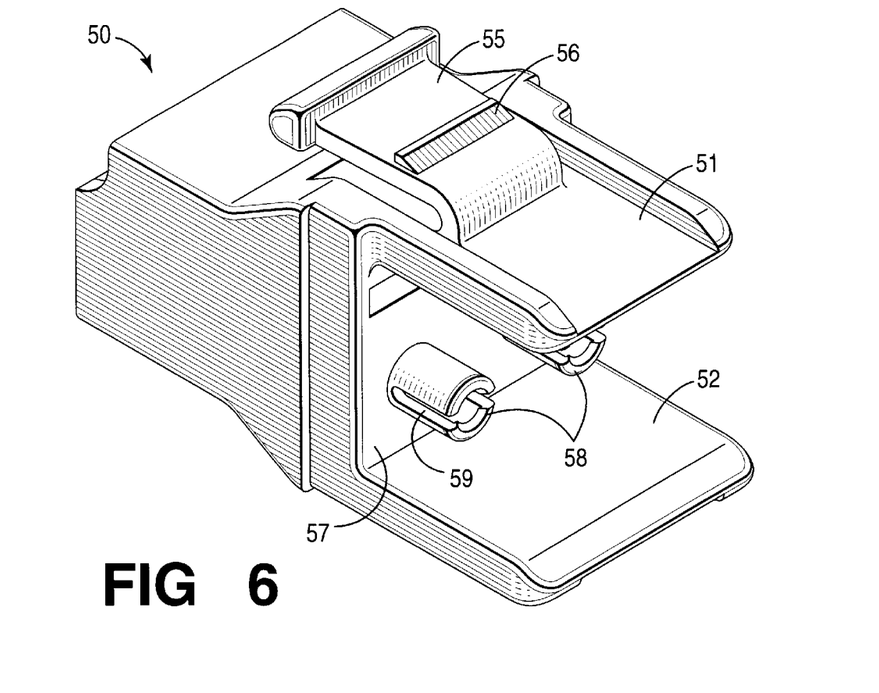
FIG. 6 is a front-end perspective view of the duplex connector.

FIG. 5 and FIG. 6 show perspective views of a duplex optical connector 50, which is designed to be easily and accurately installed into a mating receptacle. In particular, the duplex connector 50 is a unifying structure that functions to yoke a pair of simplex optical plugs 20-1, 20-2 (see FIG. 1) into a duplex configuration. Known duplex configurations are shown in U.S. Pat. Nos. 4,953,929; 5,123,071; 5,386,487; and 5,579,425. However, such configurations lack a number of advantages including dimensional stability, replacement ease of a simplex plug, and a common interlocking feature with a mating receptacle 110 (see FIG. 1).

Duplex connector 50 includes a pair of side-by-side optical ports that individually include a number of internal walls that define a cavity 153. Each cavity 153 has an opening at a back end of the duplex connector 50 that is shaped to receive a predetermined optical plug. In a preferred embodiment of the duplex connector, the opening is generally rectangular and the predetermined optical plug is an LC optical plug, which is disclosed in greater detail in U.S. Pat. Nos. 5,481,634 and 5,923,805. Nevertheless, it is understood that the cavities 153-153 within the duplex connector 50 could be shaped to receive other kinds of optical plugs, preferably those having low profiles.

Guide members 51, 52 are disposed on the top and bottom sides of the connector 50 and perform a number of valuable functions. The forward ends of the guide members 51, 52 are tapered to facilitate insertion into a mating receptacle. Moreover, guide member 52 is slightly wider than guide member 51 to provide "keying" that prevents improper (upside down) insertion of the duplex connector into the receptacle. Finally, and perhaps most importantly, the guide members 51, 52 provide additional strength to withstand side-loading forces that would otherwise be transferred to brittle, ceramic alignment sleeves 60-60 (see FIG. 1) that may reside within bosses 58-58. Such side loading typically occurs when the duplex connector 50 is being removed from a mating receptacle.

Bosses 58-58 are tubular in construction and have an inside diameter of about 1.8 millimeters (mm). A bifurcation 59 is provided in one end of each boss that facilitates insertion of an alignment sleeve 60 (see FIG. 1), which functions to axially align the cylindrical ferrules that are associated with a pair or optical plugs (e.g., 20-1 and 20-3) that are to be interconnected. Alignment sleeves 60-60 may be made from metal, but are generally made from a ceramic material such as zirconia. They have a slightly smaller outside diameter than the inside diameter of the bosses and are able to "float" within the boss. A pair of cylindrical ferrules 21 (FIG. 1) having outer diameters of about 1.25 mm are inserted into opposite ends of the same alignment sleeve 60 during service. In this illustrative embodiment, a glass fiber (diameter about 125 microns) is held within a bore that extends along the central axis of each ferrule 21. In an alternate embodiment, the glass fiber and ferrule are replaced with a plastic fiber as shown in U.S. Pat. No. 5,923,805 whose outside diameter conforms to the inside diameter of the boss 58. It is noted that alignment sleeves are not necessary when plastic fiber is used. The dimensions provided in this paragraph are illustrative only, and are based on the preferred use of LC-type optical plugs.

Flexible latching members 55-55 are disposed on the top and bottom sides of the duplex connector 50, and each contains a wedge-shaped retaining feature 56 that is adapted to cooperate with corresponding mating feature within each cell 210 of a connecting block 200. More specifically, mating features 256-1 and 256-2 reside within openings 213, 214 of cell 210 as shown in FIG. 4. Illustratively, the duplex connector is molded from thermoplastic material such as polycarbonate.

Figure 7:
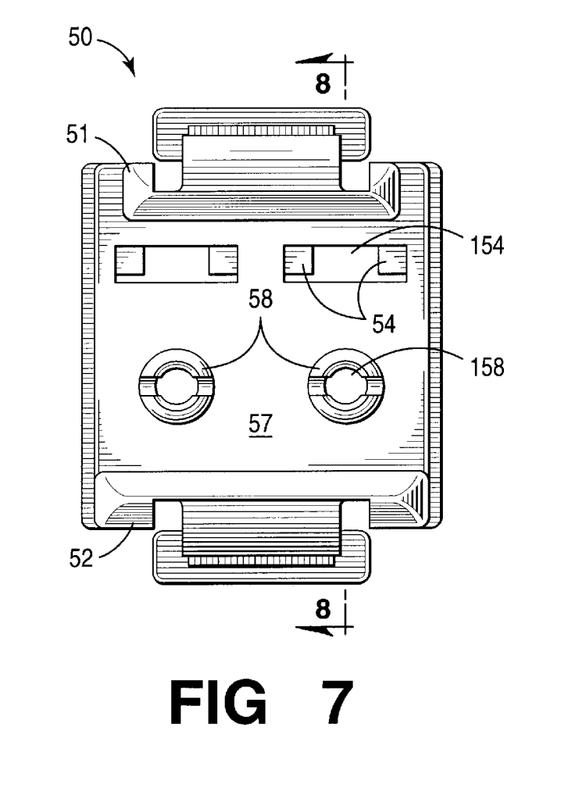
FIG. 7 is a front-end view of the duplex connector.

FIG. 7 is a front-end view of the duplex optical connector 50 showing various details of its construction. Tubular bosses 58 project from the front-end wall 57 of the connector 50 and provide a openings 158 through which optical fibers can pass and be connected, end to end, to other optical fibers. Guide members 51, 52 facilitate insertion of the duplex connector 50 into a cell of a connecting block 100, 200 or other receptacle. And while guide members 51, 52 are not required, they provide the valuable functions discussed above.

Figure 8:
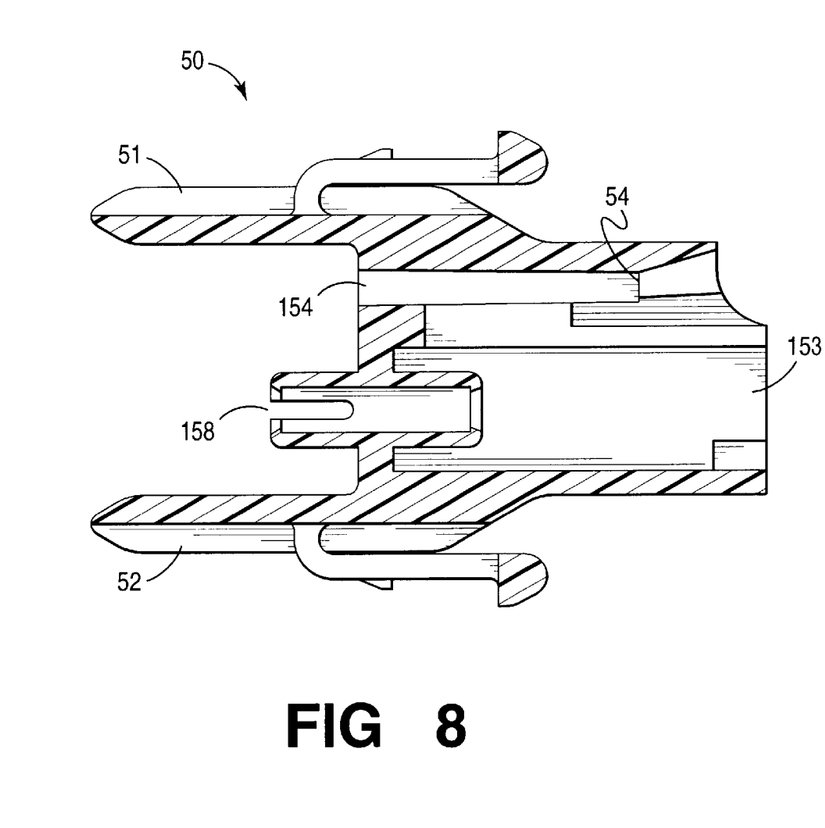
FIG. 8 is a side cross-section view of the duplex connector.
Figure 9:
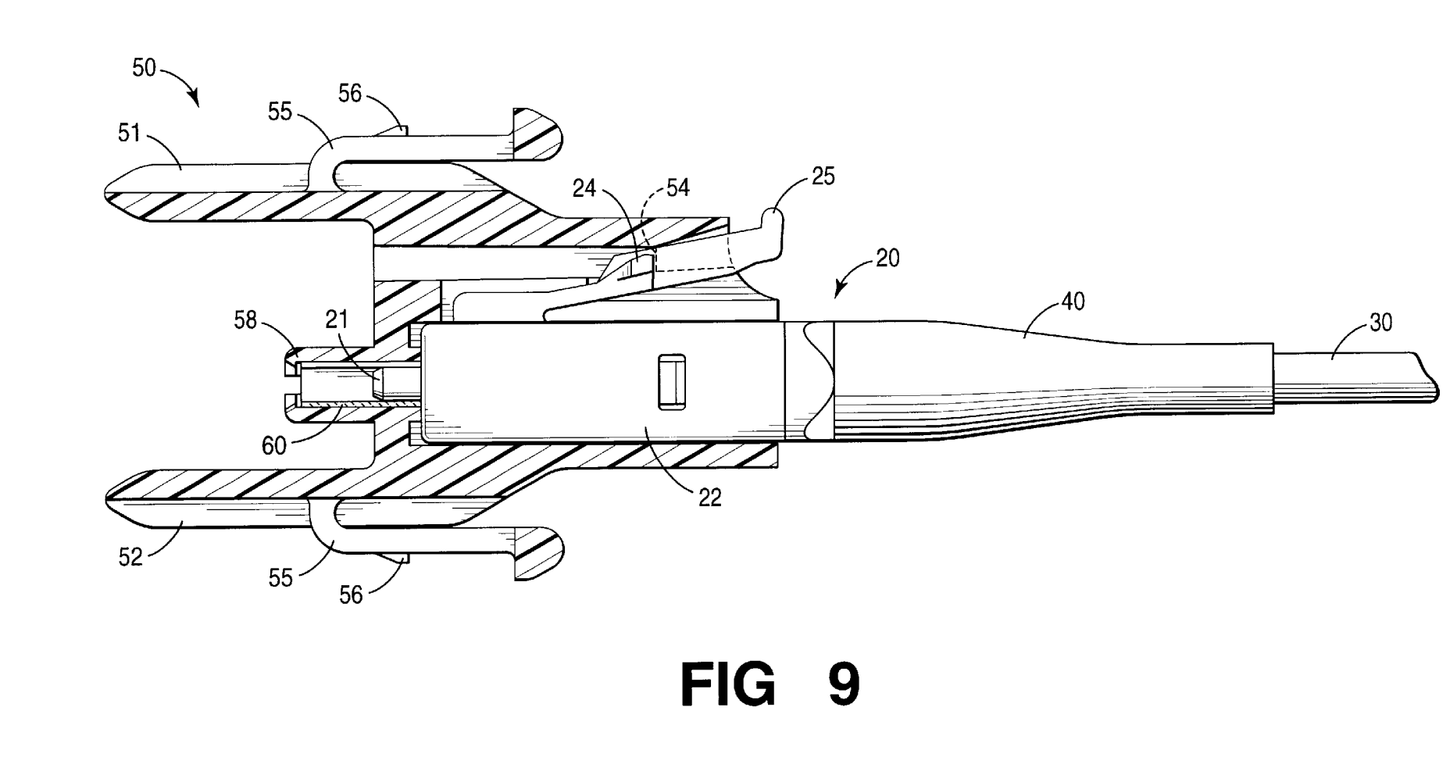
FIG. 9 is a partial cross-section view of the duplex optical connector of FIG. 8 having an optical plug inserted therein.

FIGS. 7 and 8 illustrate the various openings 153, 154, 158 into the connector 50 and their relative positioning in greater detail. Opening 153 in the back end of the connector 50 is shaped to receive and hold a simplex optical plug 20 in the manner disclosed in FIG. 9. A tool that is used during the molding process to form retaining features 54 within the connector that interlock with the optical plug creates opening 154. In particular, retaining feature 54 is designed to be intermatable with shoulders 24 on the latching tab 25 of an LC-type optical plug 20 (see FIG. 9). It is understood that different kinds of retaining features can be molded into the duplex connector 50 to accommodate different kinds of optical plugs. Finally, opening 158 extends completely through the connector, from its back end to its front end, to enable interconnection between optical fibers, FIG. 9 is a partial cross-section view of the duplex optical connector of FIG. 8 having an optical plug 20 inserted therein. As illustrated, a ferrule 21 projects from the front end of the plug housing 22 and contains an optical fiber (not shown) that is disposed along its central axis. This ferrule 21 is held within a tubular alignment sleeve 60 that includes a slot along its length that allows its diameter to expand slightly and maintain a radial alignment force on each of the ferrules (only one is shown) that are inserted into the opposite ends of the sleeve 60. The sleeve has an outer diameter that is less than the inner diameter of the boss 58, and is free to move therein. A bifurcation 59 in the boss 58 is shown most clearly in FIG. 6 and enables the boss 58 to flex during insertion of the alignment sleeve 60 during manufacture. Such flexing is necessary because the end portions of the boss need to smaller than the alignment sleeve to keep it from becoming dislodged during service and handling. FIG. 9 illustrates the interaction between a shoulder 24 on the latching tab 25 of the optical plug and the retaining feature 54 within the duplex connector 50. This interaction holds the optical plug 20 within the duplex connector. The optical plug is released by simultaneously depressing the latching tab 25 and pulling the plug away from the connector 50.

In a similar manner, the duplex connector itself is held within another receptacle (e.g., cell 210 of connecting block 200 shown in FIGS. 3 and 4). The flexible latching members 55-55 on the top and bottom sides of the duplex connector 50 function in the same manner as the latching tab 25 on the optical plug 20; and the wedge-shaped retaining features 56–56 function in the same manner as the shoulder 24 on the optical plug. The duplex connector 50 is released from the cell 210 by simultaneously depressing both latching members 55-55 and pulling the duplex connector away from the cell. For completeness, the optical plug 20 is shown terminating an optical cable 30 with a bend-limiting boot 40 disposed at the junction between the cable 30 and the optical plug 20. The boot 40 is made from an elastomeric material, and it functions to preclude severe bending of the optical fiber, which would increase the transmission loss of the optical fiber.

Although various particular embodiments of the present invention have been shown and described, modifications are possible within the scope of the invention.

These modifications include, but are not limited to the use of: different materials in the construction of the duplex connector; different kinds of optical plugs having different latching features; and the use of optical cables and plugs that are designed to accommodate plastic optical fiber.

What is claimed is:

1. A duplex optical connector having a front end, a back end, a top side and a bottom side, said duplex connector comprising:
    a pair of side-by-side optical ports, each port including internal walls that define a cavity having: (i) an opening in the back end of the connector that is shaped to receive an optical plug, (ii) a tubular boss for holding a cylindrical ferrule, said boss projecting into and out of the cavity from a wall at the front end of the connector and having a central axis that is perpendicular to the front-end wall; and (iii) a retaining feature for interlocking with a mating feature on the optical plug for holding the optical plug within the cavity; and
    a first latching member that is disposed on the top side of the duplex connector for engagement with a first mating member on a receptacle that is designed to receive the duplex connector.

2. The duplex connector of claim 1 wherein an end portion of the tubular boss is bifurcated to facilitate insertion of an alignment sleeve.

3. The duplex connector of claim 2 further including an alignment sleeve that is disposed within the tubular boss.

4. The duplex connector of claim 3 wherein the alignment sleeve is made from a ceramic material.

5. The duplex connector of claim 1 further including a second latching member that is disposed on the bottom side of the duplex connector for engagement with a second mating member in the receptacle.

6. The duplex connector of claim 5 wherein the first and second latching members comprise cantilevers having fixed ends that are positioned toward the front end of the duplex connector and free ends that extend toward the back end of the connector.

7. The duplex connector of claim 1 further including a first guide member that projects from the front end thereof and facilitates insertion of the connector into the mating receptacle.

8. The duplex connector of claim 7 wherein the first guide member comprises a tongue-like projection that is tapered at a forward end thereof.

9. The duplex connector of claim 7 further including a second guide member, wherein the first guide member is positioned on the top side of the connector and the second guide member is positioned on the bottom side of the connector.

10. The duplex connector of claim 9, wherein the guide members on the top and bottom sides are arranged to provide a keying feature, which precludes the connector from being inserted into the receptacle in more than one orientation.

11. The duplex connector of claim 10, wherein the guide members on the top and bottom sides are similarly shaped but have different sizes.

12. In combination, a pair of optical jumpers and a duplex connector
    each optical jumper comprising an optical cable that is terminated in a simplex optical plug at one or both ends thereof, said optical plug including a cylindrical ferrule having an end portion of an optical fiber disposed along its central axis;
    the duplex connector comprising a pair of side-by-side optical ports, each port including internal walls that define a cavity having: (i) an opening in a back end of the connector that is shaped to receive the optical plug, (ii) a tubular boss that holds the cylindrical ferrule, said boss projecting into and out of the cavity from a wall at a front end of the connector; and (iii) a retaining feature that cooperates with a mating feature on the optical plug to hold the optical plug within the cavity, said connector further including a latching member that is disposed on at least one side of the duplex connector for engagement with a mating member on a receptacle that is designed to receive the duplex connector.

13. The combination of claim 12, wherein one of the simplex optical plugs comprises an LC-type optical plug.

14. The combination of claim 12, wherein both of the simplex optical plugs comprises LC-type optical plugs.

15. In combination, a pair of optical jumpers and a duplex connector
    each optical jumper comprising an optical cable that is terminated in a simplex optical plug, said optical cable including a plastic fiber;
    the duplex connector comprising a pair of side-by-side optical ports, each port including internal walls that define a cavity having: (i) an opening in the back end of the connector that is shaped to receive the optical plug, (ii) a tubular boss that holds the plastic fiber, said boss projecting into and out of the cavity from a wall at a front end of the connector; and; (iii) a retaining feature that cooperates with a mating feature on the optical plug to hold the optical plug within the cavity, said connector further including a latching member that is disposed on at least one side of the duplex connector for engagement with a mating member on a receptacle that is designed to receive the duplex connector.

16. The combination of claim 15, wherein at least one of the simplex optical plugs comprises an LC-type optical plug.

17. The combination of claim 15, wherein both of the simplex optical plugs comprise LC-type optical plugs.

* * * * *